United States Patent
Ward et al.

(10) Patent No.: US 10,289,365 B2
(45) Date of Patent: May 14, 2019

(54) STORING PREFLIGHT DATA OF A PRINT JOB BASED ON PAGE RANGES

(71) Applicants: David Ward, Broomfield, CO (US); Katie Ashley Eng, Boulder, CO (US); Stephen Jared Mandry, Longmont, CO (US); Miki Judy Ushijima, Longmont, CO (US)

(72) Inventors: David Ward, Broomfield, CO (US); Katie Ashley Eng, Boulder, CO (US); Stephen Jared Mandry, Longmont, CO (US); Miki Judy Ushijima, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/351,754

(22) Filed: Nov. 15, 2016

(65) Prior Publication Data
US 2018/0136889 A1   May 17, 2018

(51) Int. Cl.
*G06F 15/00*  (2006.01)
*G06F 3/12*   (2006.01)
*G06K 15/02*  (2006.01)

(52) U.S. Cl.
CPC .......... *G06F 3/1256* (2013.01); *G06F 3/1211* (2013.01); *G06F 3/1282* (2013.01); *G06K 15/1809* (2013.01); *G06K 15/1886* (2013.01); *G06K 15/1836* (2013.01)

(58) Field of Classification Search
CPC ..... G06F 3/1256; G06F 3/1205; G06F 3/1282
USPC ........................................................ 358/1.15
See application file for complete search history.

(56) References Cited

U.S. PATENT DOCUMENTS

| 8,045,188 B2 | 10/2011 | McCarthy et al. |
| 8,384,927 B2 * | 2/2013 | Harmon ................ G06F 3/1204 358/1.15 |
| 8,489,989 B1 | 7/2013 | Phillips |
| 8,953,207 B2 | 2/2015 | Matsuo et al. |
| 2001/0044868 A1 | 11/2001 | Roztocil et al. |
| 2003/0231323 A1 * | 12/2003 | Satoh ..................... G06K 15/00 358/1.2 |
| 2014/0268185 A1 * | 9/2014 | Gopalakrishnan .......................... G06K 15/1848 358/1.2 |
| 2016/0202938 A1 | 7/2016 | Bandyopadhyay et al. |

OTHER PUBLICATIONS

Guide for Printing and Scanning; Advanced Output Center; http:/// crit.artic.edu/aoc; Feb. 4, 2016.
Simon Eccles; FESPA Print News; Preflighting customers' PDFs for success in print production; Mar. 1, 2016.

* cited by examiner

*Primary Examiner* — Mark R Milia
(74) *Attorney, Agent, or Firm* — Duft & Bornsen, PC

(57) ABSTRACT

System and methods for storing preflight data of a print job based on page ranges. In one embodiment, an apparatus includes an interface and a preflight system. The interface receives a print job and a job ticket. The preflight system processes the print job and the job ticket to determine multiple page ranges in the print job that have a similar print attribute throughout their page range. The preflight system also establishes a sheet object in memory for each page range.

20 Claims, 5 Drawing Sheets

STORING PREFLIGHT DATA OF A PRINT JOB BASED ON PAGE RANGES

FIELD OF THE INVENTION

The invention relates to the field of printing systems, and in particular, to storing preflight data for a print job.

BACKGROUND

A print shop typically includes a number of high-volume printers capable of printing large print jobs (e.g., hundreds or thousands of documents). The print shop may be managed by a print server that receives raw print jobs from a host and converts the raw print jobs into a series of rasterized images that a print engine may use for physically marking media. During rasterization, the print server may refer to job ticket information for how a particular page, or range of pages, in the print job are to be rasterized. Examples of job ticket information include a particular media size (e.g., A4 or letter size), plex (e.g., single-sided or double-sided), or an N-up format for placing one or multiple logical pages onto a sheet for printing.

Before rasterizing or scheduling the print job with a printer, the print server may perform a preflight step which gathers attribute information from the job ticket, determines characteristics of each page/sheet to be printed, and stores sheet information for each sheet that is to be printed. The preflight data may then be stored in memory so that it may be referenced during processing of the print job to convert the raw print job into properly formatted rasterized page images. It is therefore desirable for the preflight data to be efficiently collected and stored.

SUMMARY

Embodiments described herein provide for storing preflight data of a print job based on page ranges. A preflight system gathers page information by analyzing the print job and a job ticket to identify groups of consecutive pages in the print job that share print attributes. Since a typical print job for a production printer has many pages with few variations page-to-page, the preflight system is able to determine sheet information in parallel using the identified groups of consecutive pages. Moreover, the preflight system may create a single sheet object for each group, thereby reducing the number of sheet objects in memory necessary to represent the media information for the entire print as it undergoes preparation for printing.

One embodiment is an apparatus that includes an interface and a preflight system. The interface receives a print job having multiple logical pages and a job ticket associated with the print job. The preflight system processes the print job to identify a first print attribute for logical pages in the print job, processes the job ticket to identify a second print attribute that overrides the first print attribute for a subset of logical pages in the print job, identifies a first page range in the print job based on the first print attribute, and identifies a second page range in the print job based on the second print attribute. The preflight system also establishes a sheet object in memory for each of the first page range and the second page range, wherein at least one of the sheet objects represents a number of consecutive logical pages in the print job that exceeds a number N of an N-up format of the print job.

The above summary provides a basic understanding of some aspects of the specification. This summary is not an extensive overview of the specification. It is not intended to identify key or critical elements of the specification nor to delineate any scope of particular embodiments of the specification, or any scope of the claims. Its sole purpose is to present some concepts of the specification in a simplified form as a prelude to the more detailed description that is presented later. Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
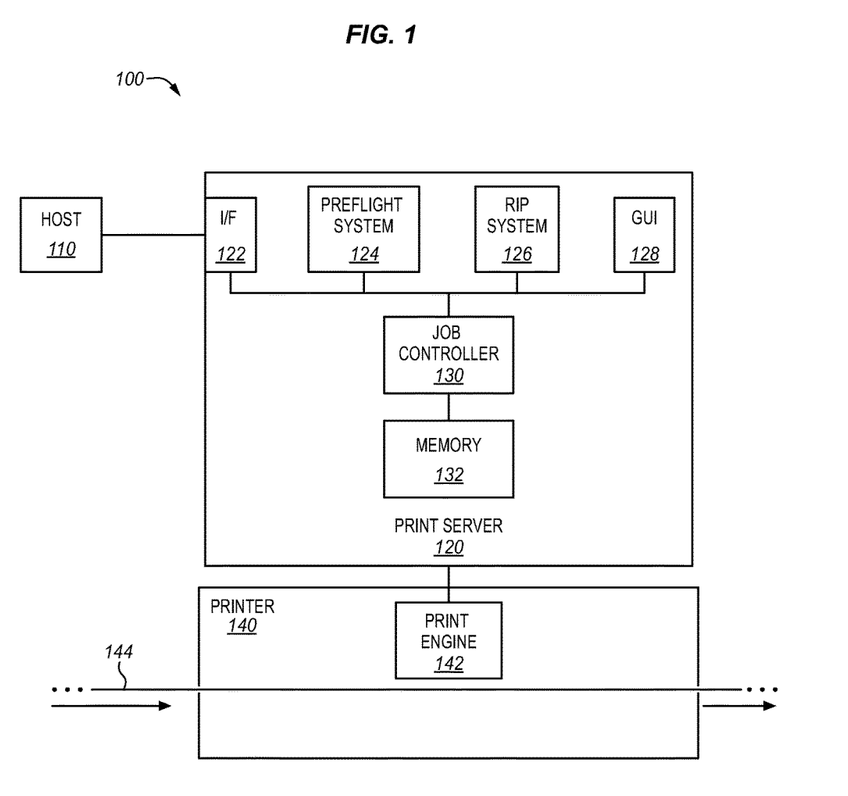
FIG. 1 is a block diagram of a print system in an exemplary embodiment.

FIG. 1 is a block diagram of a print system 100 in an exemplary embodiment. The print system 100 includes one or more host(s) 110, print server(s) 120, and printer(s) 140 that may interact to carry out any number of high-volume printing applications, such as mass-mail printing of time sensitive statements and bills. In general, a host 110 generates and submits print job(s) to a print server 120 which prepares the print jobs and schedules them with a printer 140 under its control. The printer 140 may include a production printer capable of high volume printing and may include a print engine 142 operable to physically transform the print job onto a printable medium 144, such as a paper web.

The print server 120 may include an interface 122 (e.g., an Ethernet interface, wireless interface, etc.) that receives a print job and a job ticket, and memory 132 (e.g., random access memory (RAM) or other suitable forms of data storage) to store the print job and the job ticket. The print server 120 may further include a preflight system 124 operable to collect job information, and a Raster Image Processor (RIP) system 126 operable to interpret, assemble, render, rasterize, or otherwise convert raw sheet sides for a print job into sheet side bitmaps. A graphical user interface (GUI) 128 may also be provided for user input and manipulation of print data at print server 120. A job controller 130 coordinates the overall operation of the print server 120 to transform raw print data into a series of rasterized images for a print engine 142. The particular arrangement, number, and configuration of components discussed herein are exemplary.

Figure 2:
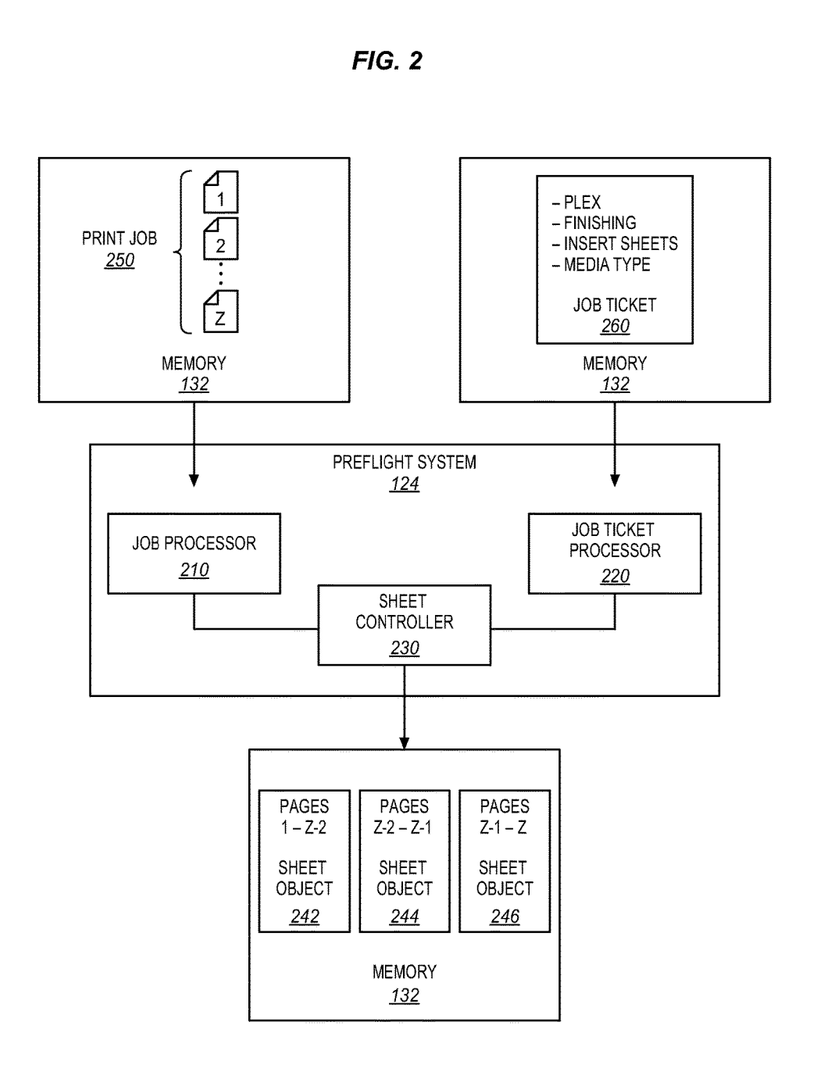
FIG. 2 is a block diagram of a preflight system in an exemplary embodiment.

FIG. 2 illustrates a preflight system 124 in an exemplary embodiment. The preflight system 124 is generally configured to perform a preprocess task that involves analyzing a print job and its job ticket to determine/collect media information. The collected media information may be stored in memory 132 so that it may be referenced by downstream data processing operations (e.g., color management, imposition, rasterization, etc.) of the print server 120 and/or printer 140. For example, the RIP system 126 may request print data for a specific logical page in the print job, assemble/rasterize the page onto a sheet according to the attribute information for that page as specified in the job ticket, and repeat until eventually each page of the print job is properly rendered as requested in the job ticket.

In previous systems, the preflight step processes the print job serially, page-by-page, and queries the job ticket for each page to determine whether any exceptions for the page exist. The preflight step resolves individual sheet properties according to the N-up format of page-to-sheet placement using this serial processing technique and stores each individual sheet as a separate data object in memory. That is, the preflight task creates a sheet object for every sheet that is to be eventually printed for the print job. For example, for a 100 page print job that is to be printed in a 2-up format, the preflight system stores 50 sheets, or sheet objects, in memory so that downstream processing tasks may fetch sheet information and prepare the print job for printing. As the size of a print job increases, this preflight approach becomes more inefficient in its gathering of page/sheet information as well as its storage of the preflight data.

The preflight system 124 is therefore enhanced to include a job processor 210, a job ticket processor 220, and a sheet controller 230 which may interact to efficiently collect page/sheet information and provide a reduced number of sheet objects 242-246 for representing the collected attribute information the print job in memory 132 of the print server 120. The job processor 210 is operable to process a print job 250 for print attributes (e.g., page size, type, color, etc.), and the job ticket processor 220 is operable to process a job ticket 260 associated with the print job 250 for additional and/or alternative print attributes. The sheet controller 230 is operable to combine or converge information from the job processor 210 and the job ticket processor 220 to implement a caching scheme in which individual sheet objects may represent an entire range of pages in the print job.

Additional details of operation are discussed below. Components of print system 100 including job controller 130, preflight system 124, job processor 210, sheet processor 220, sheet controller 230, etc. may be implemented as custom circuitry, as a processor executing programmed instructions, etc. The particular arrangement, number, and configuration of components discussed herein are exemplary.

Figure 3:
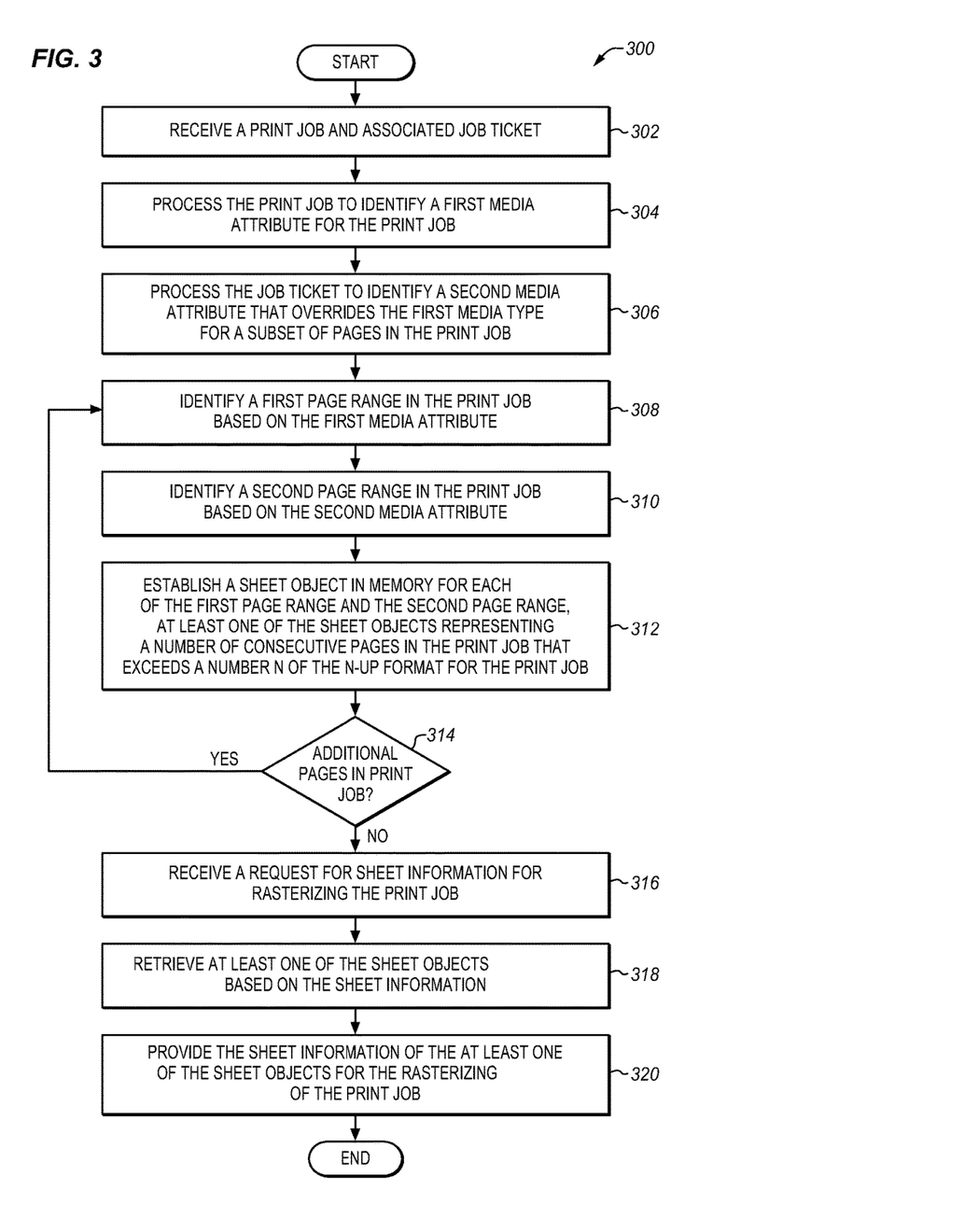
FIG. 3 is a flow chart illustrating a method for collecting and storing preflight data an exemplary embodiment.

FIG. 3 is a flow chart illustrating a method 300 for collecting and storing preflight data in an exemplary embodiment. The steps of the method 300 will be described with respect to print system 100 of FIG. 1 and the preflight system 124 of FIG. 2, though it will be appreciated that the steps may be performed in other systems, may include other steps not shown, and may be performed in an alternate order.

At step 302, the interface 122 of the print server 120 receives a print job 250 and an associated job ticket 260. The job controller 130 may correlate the print job 250 and the job ticket 260 based on filename(s), folder location(s), the submitting user of host 110, etc. Alternatively or additionally, the job controller 130 may associate a print job 250 with a job ticket 260 received from a separate source, such as from an administrator of GUI 128, a database/server external to the print server 120, etc. The job controller 130 may also store the print job 250 and job ticket 260 in memory 132.

The print job 250 may include raw print data in any format (e.g., Page Description Language (PDL), Printer Control Language (PCL), PostScript data, etc.) and may specify a particular print attribute for its pages. The job ticket 260 is any data or file (e.g., Job Definition Format (JDF), .csv extension file, etc.) that includes definitions or instructions for how the print job 250 is to be processed. For example, the job ticket 260 may include attribute information for the type of media to use (e.g., A4, media bin, color, etc.), the size and/or formatting of pages on the media (e.g., duplex, N-up configurations, image/text alignment), the type of finishing, etc. The job ticket 260 may also define an exception that overrides overlapping attribute information of the print job 250.

At step 304, the job processor 210 processes the print job 250 to identify a first print attribute for the print job 250. Thus, the job processor 210 may determine one or multiple print attributes for a specified page, group of pages, sheet(s), or for the entire print job 250 as designated in the print job 250. Examples of a print attribute include a media type (e.g., card stock), a media size (e.g., A4), a media color (e.g., Yellow), a media weight (e.g., 200 g/m$^2$), or a custom media designation (e.g., custom paper size). The job processor 210 may further determine groups of consecutive pages in the print job 250 that share common or identical attribute information based on its analysis of the print job 250. The job processor 210 may provide a list of the groups as well as each group's page number(s) and/or print attribute(s) to the sheet controller 230.

At step 306, the job ticket processor 220 processes the job ticket 260 to identify a second print attribute that overrides the first print attribute for a subset of pages in the print job 250. Thus, the job ticket processor 220 may analyze the job ticket 260 to determine any exceptions for a page, group of pages, or the print job 250 as designated in the job ticket 260. The job ticket processor 220 may further determine groups of consecutive pages in the job ticket 260 that share common or identical attribute exceptions. The job ticket processor 220 may also provide a list of the groups and/or each group's page number(s) and/or print attribute(s) to the sheet controller 230.

At step 308, the sheet controller 230 identifies a first page range in the print job 250 based on the first print attribute. The sheet controller 230 may therefore identify one or multiple distinct page ranges in the print job 250 from group information retrieved from the job processor 210. At step 310, the sheet controller 230 identifies a second page range in the print job 250 based on the second print attribute. The sheet controller 230 may thus further identify one or multiple distinct page ranges in the print job 250 from group information retrieved from the job ticket processor 220.

Additionally, the sheet controller 230 may analyze information of the identified group(s) to determine a combined list of groups. In one embodiment, the sheet controller 230 is operable to identify multiple distinct page range groups based on an overlap between the print job 250 and the job ticket 260. For instance, for a print job 250 that includes 10 pages with a job ticket 260 that indicates an exception only for page 6, the sheet controller 230 may segment the print job 250 into a first group that includes pages 1-5, a second group that includes page 6, and a third group that includes pages 7-10. The first print attribute(s) and the second print attribute(s) may be unrelated. For instance, the sheet controller 230 may identify a first print attribute that indicates a media, identify a second print attribute that indicates a range of page exceptions for the plex, and create subsets of pages for step 308. In one embodiment, at least two page ranges and/or groups are kept separate because the sheet controller 230 determines that the page ranges include a sheet break. A sheet break is the location where relevant sheet properties change in the print job 250. In one embodiment, the sheet break is more specifically the page where the sheet media information properties are different than the prior sheet media properties. For example, if page 10 belongs to an A3 size sheet and page 11 belongs to a Letter size sheet, then in that case there is a sheet break at page 11. In other embodiments, changed sheet properties such as plex or finishing cause a sheet break.

In another embodiment, the sheet controller 230 may be configured to detect attributes and/or exceptions identified by the job processor 210 and/or job ticket processor 220 that do not cause sheet breaks in the print job 250, and to combine at least two page range groups based on an elimination of a page range group that includes non-break attributes/exceptions. For instance, the job ticket processor 220 may identify a page range group that is not identical to adjacent page range group(s) based on an instruction to rotate page(s) for the group, and the sheet controller 230 may merge the non-identical page range with adjacent page range group(s) in response to a determination that the rotation does not cause a sheet break in the print job 250.

With the converged information of the job processor 210 and the job ticket processor 220, the sheet controller 230 may efficiently determine sheet properties of the print job 250 in parallel fashion. Since every page within a page range established by steps 304-310 may be guaranteed to have substantially consistent print attributes with other pages within that page range (e.g., no sheet breaks) according to both the print job 250 and the job ticket 260, the sheet controller 230 may resolve all sheet properties for the print job 250 by determining a sheet object for each page range. Thus, the sheet controller 230 may determine the properties of one sheet object and avoid the processing of all additional pages/sheets for that page range. The sheet controller 230 may therefore resolve all sheet properties for the print job 250 by querying the job ticket 260 for each identified page range instead of querying the job ticket 260 for each page of the print job 250. Exemplary properties (i.e., attributes) of a sheet that is to be printed include plex (e.g., simplex or duplex), finishing (e.g., gloss type, stapling, etc.), insert pages to attach before or after a sheet, media information (e.g., size, type, color, weight, etc. for a sheet), which logical pages belong to a sheet (e.g., N-up printing configuration of the sheet and/or insert sheets to attach), etc. Some or all of these sheet properties may be included in the sheet object. Some property values of the logical pages (e.g., media type, color, and/or weight) are the same as the property values of the sheet object that the logical pages belong to and thus sheet objects may contain both sheet property and logical page property information.

At step 312, the sheet controller 230 establishes a sheet object in memory 132 for each of the first page range and the second page range. At least one of the sheet objects created or established in memory 132 may represent a number of consecutive pages in the print job 250 that exceeds a number N of the N-up format for the print job 250. Thus, the sheet controller 230 may store one sheet object in memory 132 for each page range group identified for the print job 250, and may assign or associate the properties of a sheet object with additional pages in the print job 250 which may otherwise exceed the storage capacity of the sheet object. For instance, for pages to be printed in a 2-up format, a sheet object in memory 132 may reference the attributes/exceptions for more than two pages of the print job 250.

In one embodiment, one sheet object in memory 132 may represent a number of pages that exceeds a multiplication result of the integer N (e.g., N-up format of the pages in the page range) with the integer that represents plex for the pages in the page range (e.g., one for simplex, two for duplex, etc.). For instance, for a 10 page print job in which pages 1-8 are to be printed in a 2-up, duplex format (with exceptions indicates for pages 9-10), the sheet controller 230 may create one sheet object to represent pages 1-8 for a first identified page range. Thus, one sheet object may represent 8 pages which exceeds the multiplication result of 4 obtained by multiplying the integer N (e.g., 2) with the integer of plex (e.g., 2) for the pages of the first page range.

Therefore, for relatively large print jobs 250 with relatively few media variations, a sheet object may comprise a data structure or pointer for a unit of memory 132 that is relatively small (e.g., operable to store properties of one or multiple N pages for an individual sheet to be printed for the print job 250) yet able to represent or identify properties of a relatively large number of sheets/pages in the print job 250 (e.g., a number of consecutive pages in the print job 250 which are greater in number than N of the N-up format). All sheets/pages assigned to a single cache item in memory 132 may have the same print attribute as one another but a different print attribute than another sheet object created/cached in memory 132 for a different page range of the same print job 250. Thus, in some instances, a sheet object and corresponding page range may refer to a number of consecutive pages equal to or less than N of the specified N-up printing format, but at least one other sheet object for the same print job 250 may nonetheless represent a large, unvarying portion of the print job 250 to reduce the overall number of cache items in memory 132 to represent the entire print job 250.

At step 314, the sheet controller 230 may determine whether there are additional pages in the print job 250. If so, the process may return to step 308 and the sheet controller 230 may use the combined information from the print job 250 and the job ticket 260 to determine additional page ranges in the print job 250 with similar print attributes. In this way, the sheet controller 230 may iteratively identify page ranges and store a sheet object for each page range for the entire print job 250. After a sheet object for a page range has been stored in memory 132 and/or after all sheet objects have been stored in memory 132 to represent all logical pages in the print job 250, the process may proceed to step 316 and the stored sheet object(s) may be retrieved for downstream print job 250 processing requests.

At step 316, the job controller 130 receives a request for sheet information for rasterizing the print job 250. The request may identify a page, group of pages, or sheet for which attribute information for carrying out the processing task is desired. Processing units of the print server 120 and/or printer 140 other than RIP system 126 may issue similar requests to the job controller 130.

At step 318, the job controller 130 retrieves at least one of the sheet objects based on the sheet information. The job controller 130 may therefore identify a sheet object in memory 132 associated with the page(s)/sheet(s) of the request. The association between the collected/determined preflight data and a sheet object may be stored in response to creating/establishing the sheet object and the association may be stored in memory 132 (e.g., in the form of a lookup table) or in the sheet object itself.

At step 320, the job controller 130 provides the sheet information of at least one of the sheet objects for the rasterizing of the print job 250. Thus, in response to a read request from RIP system 126 (or another requesting task for processing print job 250) for attribute information for particular logical page(s) or sheet(s), the job controller 130 returns a single cache item from memory 132 that corresponds with the requested information. Thus, the job controller 130 may handle subsequent read requests for attributes in a reduced amount of memory units for improved print data storage and management for processing print job(s) 250. The job controller 130 may therefore detect and manage iterative requests (e.g., repeat steps 316-320 to rasterize all pages of the print job 250) for attribute information for the logical pages of the print job to help carry out processing tasks using the preflight caching scheme of the sheet controller 230 which efficiently determines preflight data and supports fast read operations of attribute information from reduced units of memory 132.

Examples

Figure 4:
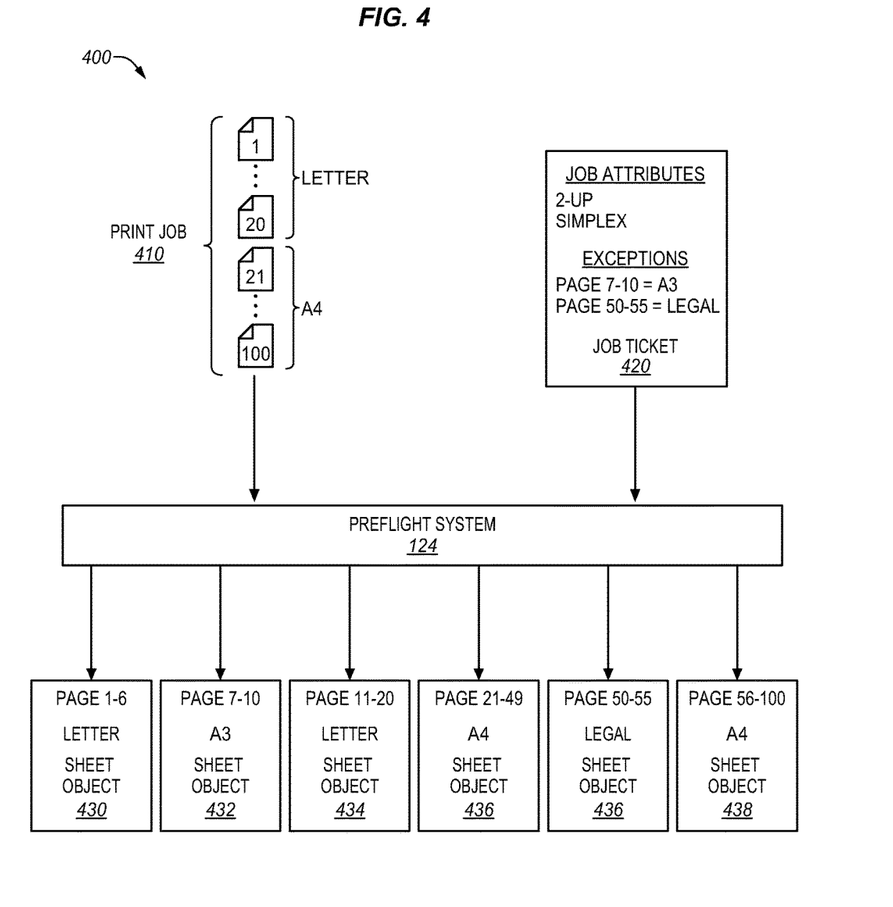
FIG. 4 illustrates an example of storing preflight data for an exemplary print job and job ticket.

FIG. 4 illustrates an example 400 of storing preflight data for an exemplary print job and job ticket 260. Assume for this example, that the preflight system 124 receives a print job 410 that includes 100 pages and that the print job 410 specifies pages 1-20 to be printed on a Letter media size and pages 21-100 to be printed on an A4 media size. Further assume that its accompanying job ticket 420 designates the job be printed in a 2-up, simplex format and also designates two exceptions for the print job, the first exception specifying that pages 7-10 be printed on A3 media size, and the second exception specifying that pages 50-55 be printed on Legal media size.

In prior preflight systems, the job ticket 420 is queried 100 times for each of the 100 pages of the print job. Properties of each sheet are determined serially, page-by-page, with 2 pages to a sheet as instructed in the job ticket 420. Properties of each sheet are determined based on the page attributes of two pages that are to be printed on the sheet. Furthermore, a sheet object is created/stored in memory for each sheet to be printed. In total, 50 sheet objects are created in memory once preflight processing is completed.

By contrast, the enhanced preflight system 124 analyzes the print job 410 and the job ticket 420 together to detect distinct groups of consecutive pages with common or identical print attributes. That is, the preflight system 124 analyzes the print job 410 to determine two separate page ranges with different print attributes in the print job 410: a first page range that includes pages 1-20 and a second page range that includes 21-100. The preflight system also analyzes the job ticket 420 to determine two additional separate page ranges: a third page range that includes pages 7-10 and a fourth page range that includes pages 50-55. The preflight system 124 may determine these page ranges without querying the job ticket 100 times for each page in the print job 410.

Additionally, the preflight system 124 may determine that the excepted page ranges 7-10 and 50-55 of the job ticket 420 overlap with ranges 1-20 and 21-100, respectively, in the print job 410. Since both page ranges of the job ticket 420 override the designations of the print job 410, the preflight system 124 determines that the combined designations of the print job 410 and the job ticket 420 create six distinct groups of consecutive pages in the print job that share the same print attributes. That is, the preflight system 124 identifies a first page range that includes pages 1-6 to be printed on Letter, a second page range that includes pages 7-10 to be printed on A3, a third page range that includes pages 11-20 to be printed on Letter, a fourth page range that includes pages 21-49 to be printed on A4, a fifth page range that includes pages 50-55 to be printed on Legal, and a sixth page range that includes pages 56-100 to be printed on A4.

Next, the preflight system 124 creates six sheet objects 430-438 in memory 132, one sheet object for each of the six identified page ranges. Since the media designation within each page range is consistent and does not cause any sheet breaks, each sheet object may be used to produce a single sheet for any page in the range regardless of the number of pages in the range. Thus, the preflight system 124 may determine properties of the sheets for the print job 410 in parallel and determine sheet properties just six times compared with the fifty-one sheet properties determined by the prior systems. After the RIP system 126 rasterizes logical pages using information obtained from memory 132 as described above, it sends the rasterized logical pages to print engine 142 for physical printing. Moreover, in preflight system 124, the six sheet objects 430-438 in memory 132 represent the fifty-one actual sheets to be produced during printing of the print job 410. Thus, the job controller 130 may provide one of the sheet objects 430-438 in response to a read request by the RIP system 126 for attribute information for any page belonging to that sheet object.

Figure 5:
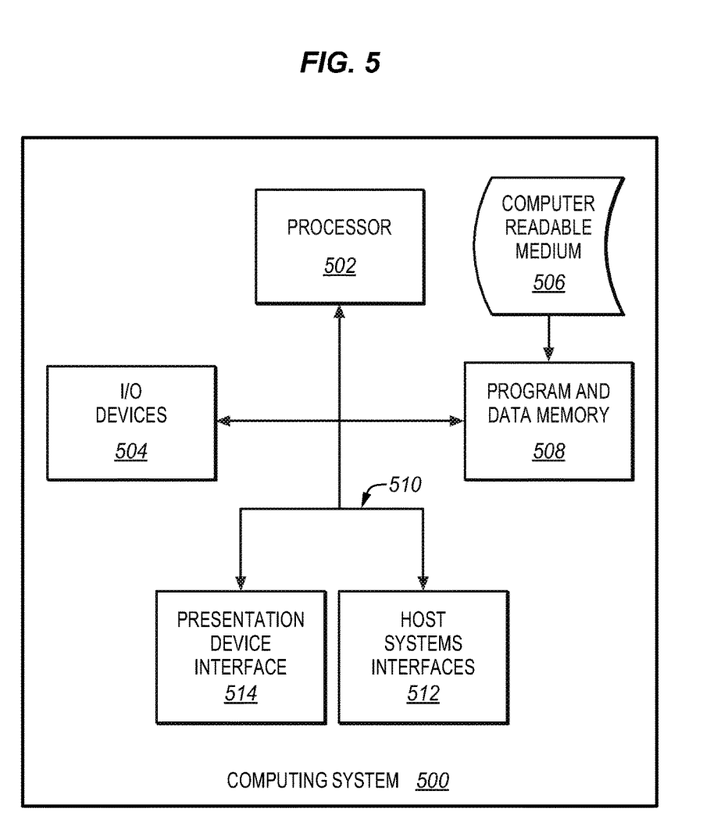
FIG. 5 illustrates a processing system operable to execute a computer readable medium embodying programmed instructions to perform desired functions in an exemplary embodiment.

Print server 120 and related components such as the job controller 130, sheet controller 230, etc. may perform the operations and functions described herein by executing one or more sequences of instructions stored on a machine/computer readable medium. Embodiments disclosed herein can take the form of software, hardware, firmware, or various combinations thereof. FIG. 5 illustrates a processing system 500 configured to execute a computer readable medium embodying programmed instructions to perform desired functions in an exemplary embodiment. Processing system 500 is configured to perform the above operations by executing programmed instructions tangibly embodied on computer readable medium 506. In this regard, embodiments can take the form of a computer program accessible via computer readable medium 506 providing program code for use by a computer or any other instruction execution system. For the purposes of this description, computer readable medium 506 may be anything that contains or stores the program for use by the computer.

Computer readable medium 506 can be an electronic, magnetic, optical, electromagnetic, infrared, or semiconductor device. Examples of computer readable medium 506 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. Processing system 500, being suitable for storing and/or executing the program code, includes at least one processor 502 coupled to program and data memory 508 through a system bus 510. Program and data memory 508 may include local memory employed during actual execution of the program code, bulk storage, and cache memories that provide temporary storage of at least some program code and/or data in order to reduce the number of times the code and/or data are retrieved from bulk storage during execution.

Input/output or I/O devices 504 (including but not limited to keyboards, displays, pointing devices, etc.) may be coupled either directly or through intervening I/O controllers. Host system interfaces 512 may also be integrated with the system to enable processing system 500 to become coupled to other data processing systems or storage devices through intervening private or public networks. Modems, cable modems, SCSI, Fibre Channel, and Ethernet cards are just a few of the currently available types of network or host interface adapters. Presentation device interface 514 may be integrated with the system to interface to one or more presentation devices, such as printing systems and displays for presentation of presentation data generated by processor 502. Although specific embodiments were described herein, the scope of the inventive concept(s) is not limited to those specific embodiments. The scope of the inventive concept(s) is defined by the following claims and any equivalents thereof.

What is claimed is:

1. An apparatus comprising:
an interface configured to receive a print job having multiple logical pages and a job ticket having media exceptions for the print job, wherein the print job has a specified N-up format for printing one or more logical pages on a sheet; and
a preflight system configured to process the print job to determine a first page range of consecutive pages in the print job that share a first media type for printing, and to process the media exceptions of the job ticket to determine a second page range of consecutive pages in the print job that share a second media type for printing, wherein the first page range and the second page range are different sets of consecutive pages in the print job, and wherein the first media type and the second media type are different media types,
the preflight system further configured to establish a first sheet object in memory that provides information of the first media type in response to media property requests of pages belonging to the first page range, and to establish a second sheet object in the memory that provides information of the second media type in response to media property requests of pages belonging to the second page range, wherein in processing of the print job at least one of the first sheet object and the second sheet object fulfills media property requests for a number of consecutive logical pages in the print job that exceeds a number N of the N-up format specified for the print job.

2. The apparatus of claim 1 further comprising:
a job controller configured to receive a request for sheet information for rasterizing the print job, to retrieve the at least one of the first sheet object and the second sheet object based on the sheet information, and to provide the sheet information of the at least one of the first sheet object and the second sheet object for the rasterizing of the print job.

3. The apparatus of claim 1 wherein:
the preflight system is configured to assign a sheet object to the first page range; and
all logical pages in the first page range have a same media property.

4. The apparatus of claim 1 wherein:
a sheet object identifies a media property for multiple sheets to be printed.

5. The apparatus of claim 1 wherein:
one sheet object represents a number of consecutive logical pages in the print job that exceeds a multiplication result of a number N of an N-up format of the number of consecutive logical pages and an integer that indicates a plex for the number of consecutive logical pages.

6. The apparatus of claim 1 wherein:
the N of the N-up format is specified in the job ticket; and
the N of the N-up format of the print job is greater than one.

7. A method comprising:
receiving a print job having multiple logical pages and a job ticket having media exceptions for the print job, wherein the print job has a specified N-up format for printing one or more logical pages on a sheet;
processing the print job to determine a first page range of consecutive pages in the print job that share a first media type for printing;
processing the media exceptions of the job ticket to determine a second page range of consecutive pages in the print job that share a second media type for printing, wherein the first page range and the second page range are different sets of consecutive pages in the print job, and the first media type and the second media type are different media types;
establishing a first sheet object in memory that provides information of the first media type in response to media property requests of pages belonging to the first page range; and
establishing a second sheet object in the memory that provides information of the second media type in response to media property requests of pages belonging to the second page range, wherein in processing of the print job at least one of the first sheet object and the second sheet object fulfills media property requests for a number of consecutive logical pages in the print job that exceeds a number N of the N-up format specified for the print job.

8. The method of claim 7 further comprising:
receiving a request for sheet information for rasterizing the print job;
retrieving the at least one of the first sheet object and the second sheet object based on the sheet information; and
providing the sheet information of the at least one of the first sheet object and the second sheet object for the rasterizing of the print job.

9. The method of claim 7 further comprising:
assigning a sheet object to the first page range, wherein all logical pages in the first page range have a same media property.

10. The method of claim 7 wherein:
a sheet object identifies a media property for multiple sheets to be printed.

11. The method of claim 7 wherein:
one sheet object represents a number of consecutive logical pages in the print job that exceeds a multiplication result of a number N of an N-up format of the number of consecutive logical pages and an integer that indicates a plex for the number of consecutive logical pages.

12. The method of claim 7 wherein:
the N of the N-up format is specified in the job ticket.

13. The method of claim 7 wherein:
the N of the N-up format of the print job is greater than one.

14. A non-transitory computer readable medium embodying programmed instructions, which, when executed by a processor, are operable for performing a method comprising:

receiving a print job having multiple logical pages and a job ticket having media exceptions for the print job, wherein the print job has a specified N-up format for printing one or more logical pages on a sheet;

processing the print job to determine a first page range of consecutive pages in the print job that share a first media type for printing;

processing the media exceptions of the job ticket to determine a second page range of consecutive pages in the print job that share a second media type for printing, wherein the first page range and the second page range are different sets of consecutive pages in the print job, and the first media type and the second media type are different media types;

establishing a first sheet object in memory that provides information of the first media type in response to media property requests of pages belonging to the first page range; and establishing a second sheet object in the memory that provides information of the second media type in response to media property requests of pages belonging to the second page range, wherein in processing of the print job at least one of the first sheet object and the second sheet object fulfills media property requests for a number of consecutive logical pages in the print job that exceeds a number N of an N-up format of the print job.

15. The medium of claim 14, wherein the method further comprises:

receiving a request for sheet information for rasterizing the print job;

retrieving the at least one of the first sheet object and the second sheet object based on the sheet information; and providing the sheet information of the at least one of the first sheet object and the second sheet object for the rasterizing of the print job.

16. The medium of claim 14, wherein the method further comprises:

assigning a sheet object to the first page range, wherein all logical pages in the first page range have a same media property.

17. The medium of claim 14, wherein:

a sheet object identifies a media property for multiple sheets to be printed.

18. The medium of claim 14, wherein:

one sheet object represents a number of consecutive logical pages in the print job that exceeds a multiplication result of a number N of an N-up format of the number of consecutive logical pages and an integer that indicates a plex for the number of consecutive logical pages.

19. The medium of claim 14 wherein:

the N of the N-up format is specified in the job ticket.

20. The medium of claim 14 wherein:

the N of the N-up format of the print job is greater than one.

* * * * *